US011780044B2

(12) United States Patent
Yagash

(10) Patent No.: US 11,780,044 B2
(45) Date of Patent: Oct. 10, 2023

(54) CONVEYOR BELT SANDING ASSEMBLY

(71) Applicant: Frank Yagash, Omaha, NE (US)

(72) Inventor: Frank Yagash, Omaha, NE (US)

( * ) Notice: Subject to any disclaimer, the term of this patent is extended or adjusted under 35 U.S.C. 154(b) by 0 days.

(21) Appl. No.: 17/671,910

(22) Filed: Feb. 15, 2022

(65) Prior Publication Data
US 2023/0256556 A1 Aug. 17, 2023

(51) Int. Cl.
*B24B 7/12* (2006.01)
*B07C 3/08* (2006.01)
*B65G 15/30* (2006.01)

(52) U.S. Cl.
CPC ............... *B24B 7/12* (2013.01); *B07C 3/08* (2013.01); *B65G 15/30* (2013.01)

(58) Field of Classification Search
CPC .............. B24B 7/12; B07C 3/08; B65G 15/30
See application file for complete search history.

(56) References Cited

U.S. PATENT DOCUMENTS

| | | |
|---|---|---|
| 2,878,926 A | 3/1959 | Harty |
| D260,357 S | 8/1981 | Brannan |
| 4,498,577 A | 2/1985 | Veenhof |
| 4,643,293 A | 2/1987 | Swinderman |
| 5,161,669 A | 11/1992 | Gibson, Jr. |
| 5,735,385 A | 4/1998 | Bowler |
| 6,086,461 A * | 7/2000 | Williams ................ B24B 21/12 451/302 |
| 6,213,287 B1 | 4/2001 | Juracko |

FOREIGN PATENT DOCUMENTS

CN 212858844 U * 4/2021

OTHER PUBLICATIONS https://www.instructables.com/Quick-and-Easy-Sanding-Block/, Autodesk Instructables (Year: 2017).*
KR102473186B1 (Year: 2022).*

* cited by examiner

*Primary Examiner* — Gene O Crawford
*Assistant Examiner* — Lester Rushin, III

(57) ABSTRACT

A conveyor belt sanding assembly includes a panel is comprised of a rigid material. A pair of clips is each coupled to the panel and each of the clips releasably engages a paddle of a mail sorting machine thereby mounting the panel to the paddle. A sheet of sand paper is bonded to the panel and the sheet of sand paper is positioned on an opposing surface of the panel with respect to the clips. In this way the sheet of sand paper is directed toward the conveyor belt of the mail sorting machine. The sand paper abrades the conveyor belt when the paddle is moved against the conveyor belt to enhance the capacity of the conveyor belt to frictionally engage mail that is being sorted by the mail sorting machine.

10 Claims, 5 Drawing Sheets

CONVEYOR BELT SANDING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to sanding devices and more particularly pertains to a new sanding device for sanding a conveyor belt of a mail sorting machine. The device includes a panel and a pair of clips attached to the panel which engage a paddle of a mail sorting machine. The device includes a sheet of sand paper that is bonded to the panel and which abrades the conveyor belt when the paddle is moved against the conveyor belt. In this way sand paper enhances the capacity of the conveyor belt to frictionally engage mail that is being sorted by the mail sorting machine.

(2) Description of Related Art Including Information Disclosed Under 37 CFR 1.97 and 1.98

The prior art relates to sanding devices including a conveyor abrading device that includes a pair of abrasive members that are oriented to extend across a conveyor belt to abrade the conveyor belt. The prior art discloses a conveyor belt cleaning device that includes a cleaning device that comprises a plurality of abrasive disks that each abrades a conveyor belt. The prior art discloses a conveyor belt cleaning device that includes a plurality of blade holders and a plurality of blades for removing debris from a conveyor belt. The prior art discloses a conveyor belt cleaning device that comprises an elongated spring that is flexed to engage a conveyor belt thereby removing debris from the conveyor belt.

BRIEF SUMMARY OF THE INVENTION

An embodiment of the disclosure meets the needs presented above by generally comprising a panel is comprised of a rigid material. A pair of clips is each coupled to the panel and each of the clips releasably engages a paddle of a mail sorting machine thereby mounting the panel to the paddle. A sheet of sand paper is bonded to the panel and the sheet of sand paper is positioned on an opposing surface of the panel with respect to the clips. In this way the sheet of sand paper is directed toward the conveyor belt of the mail sorting machine. The sand paper abrades the conveyor belt when the paddle is moved against the conveyor belt to enhance the capacity of the conveyor belt to frictionally engage mail that is being sorted by the mail sorting machine.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
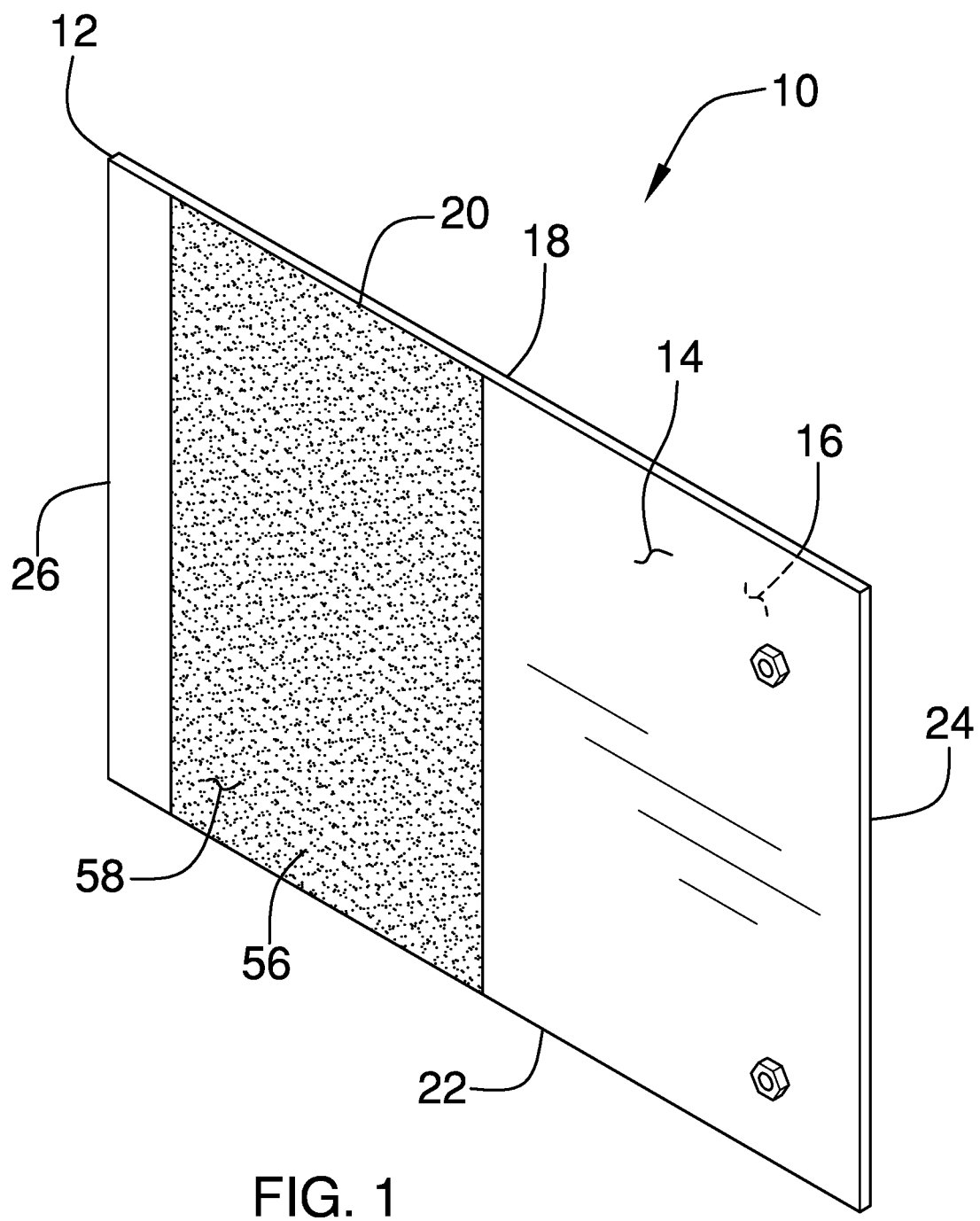
FIG. 1 is a front perspective view of a conveyor belt sanding assembly according to an embodiment of the disclosure.
Figure 2:
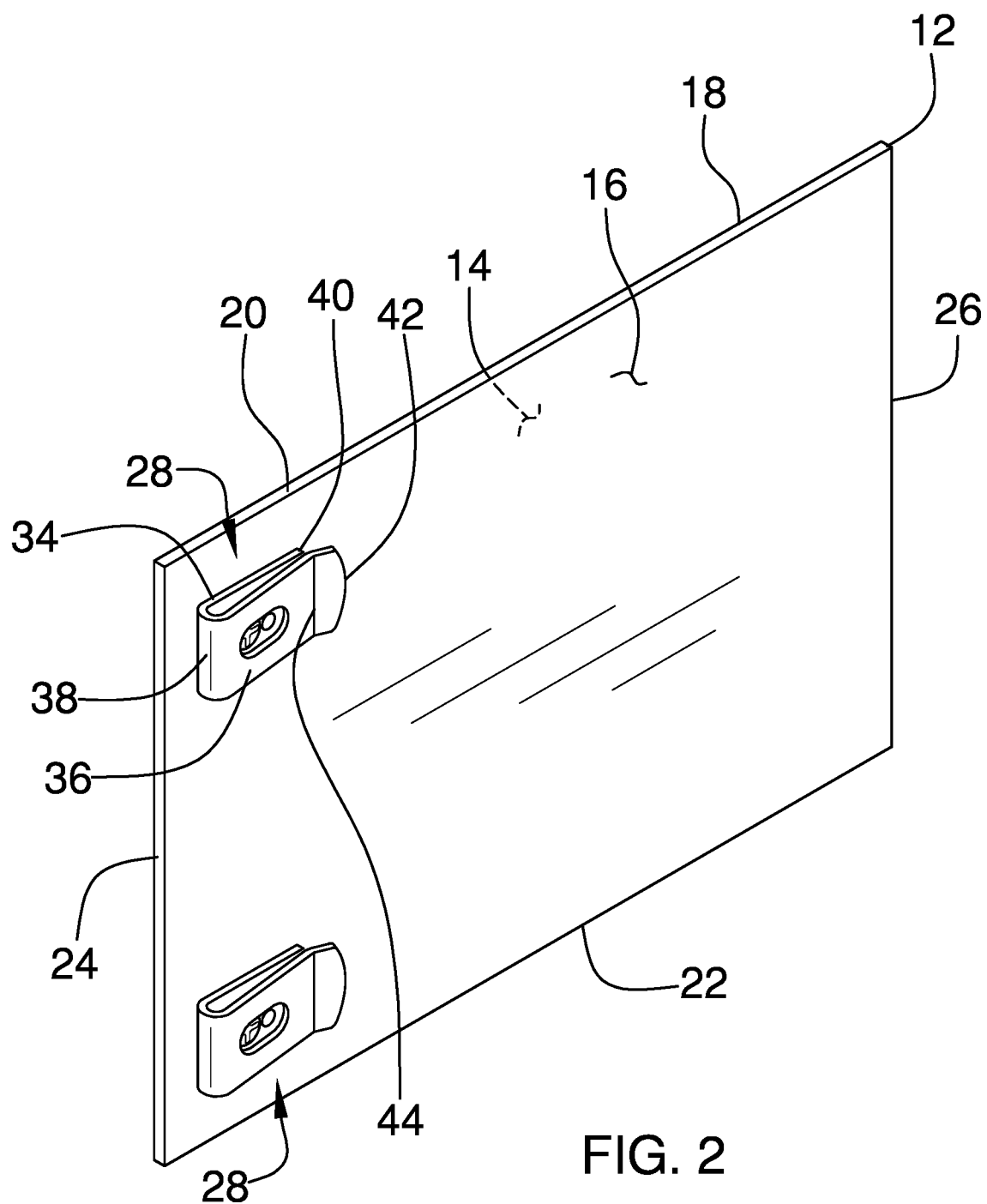
FIG. 2 is a back perspective view of an embodiment of the disclosure.
Figure 3:
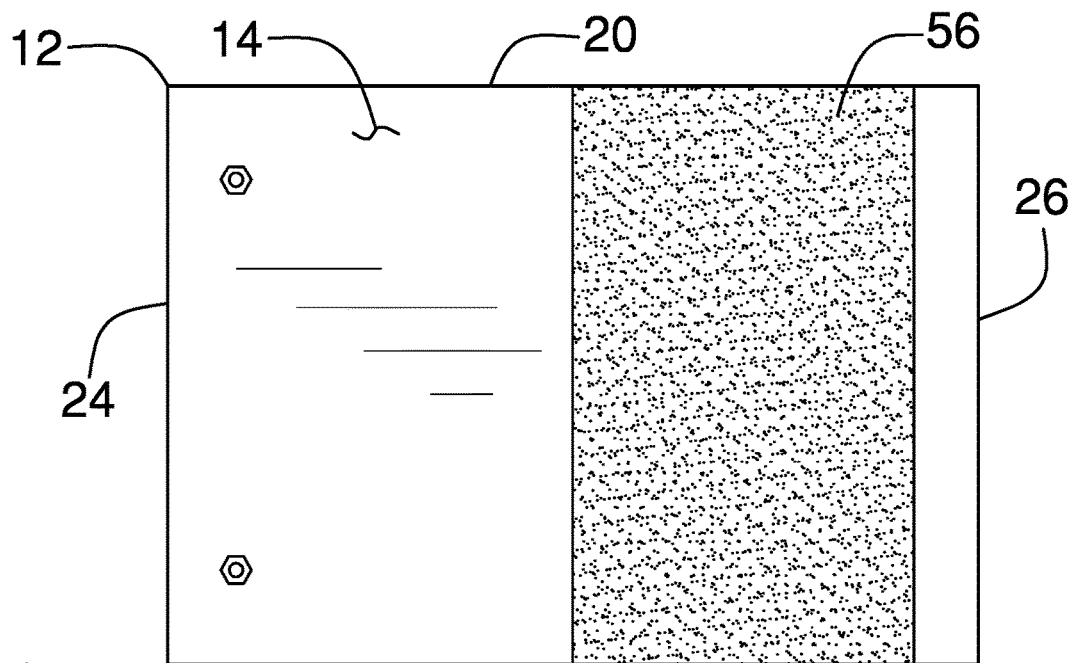
FIG. 3 is a front view of an embodiment of the disclosure.
Figure 4:
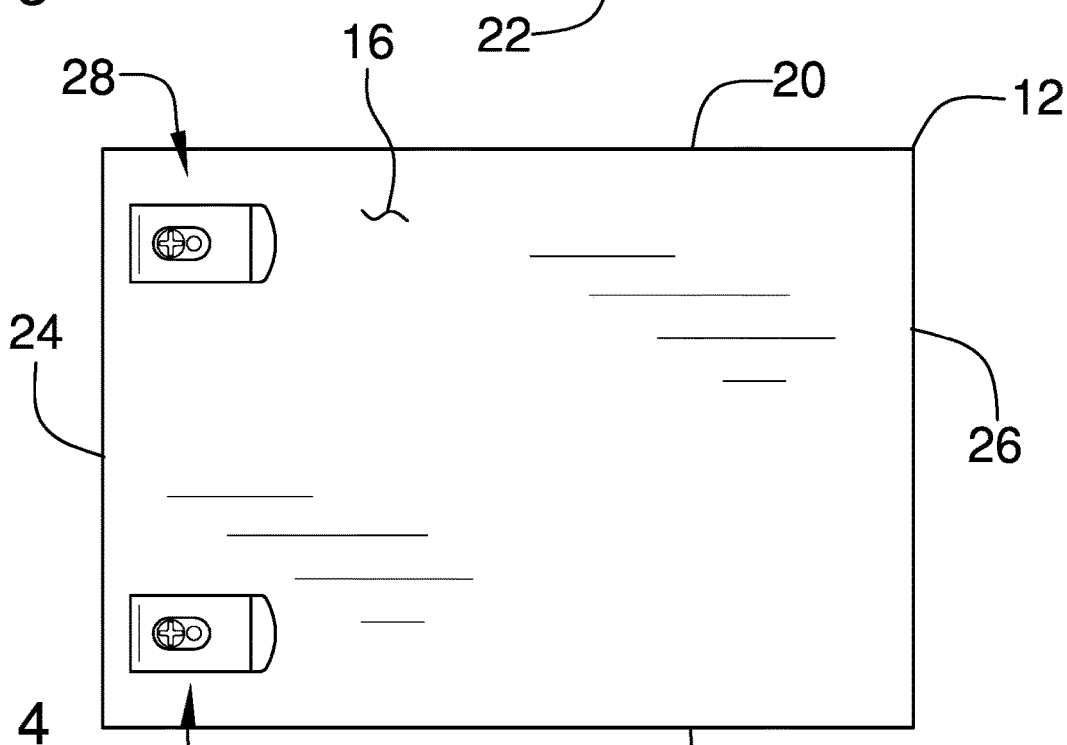
FIG. 4 is a back view of an embodiment of the disclosure.
Figure 5:
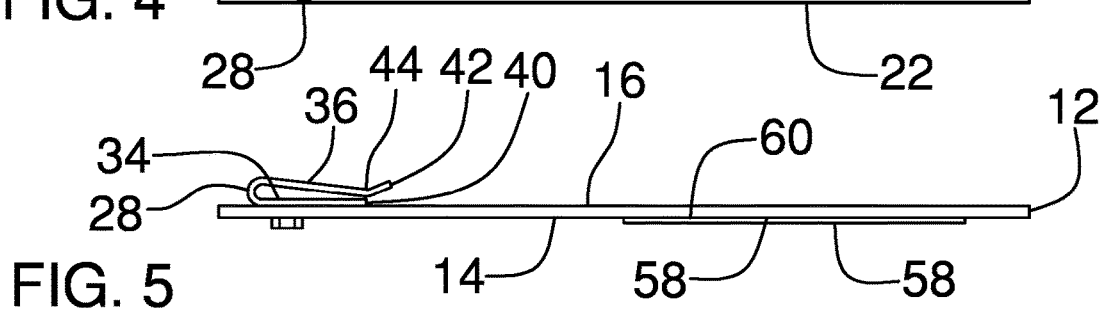
FIG. 5 is a top view of an embodiment of the disclosure.
Figure 6:
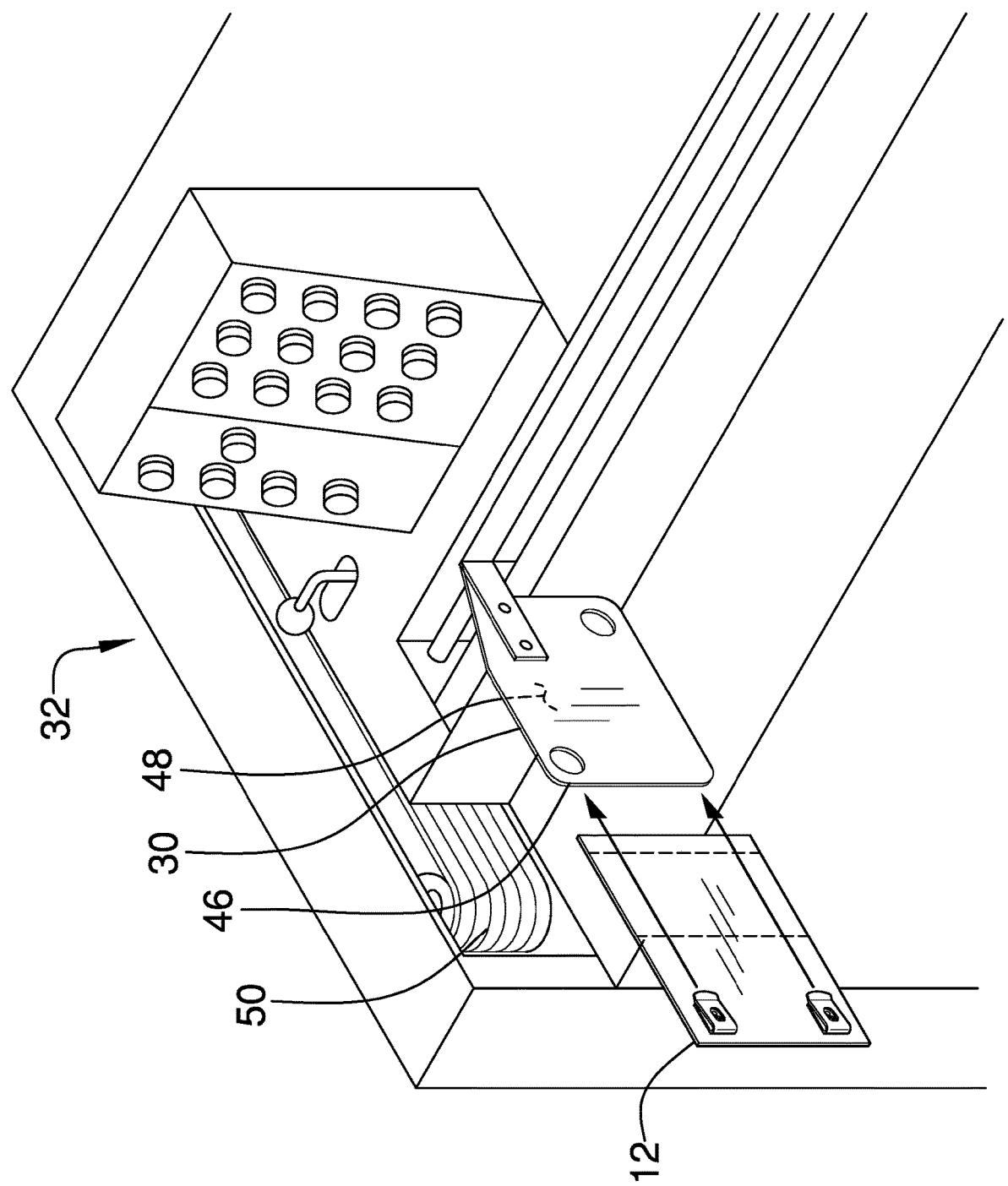
FIG. 6 is a perspective in use view of an embodiment of the disclosure showing a paddle being displaced from a conveyor belt of a mail sorting machine.
Figure 7:
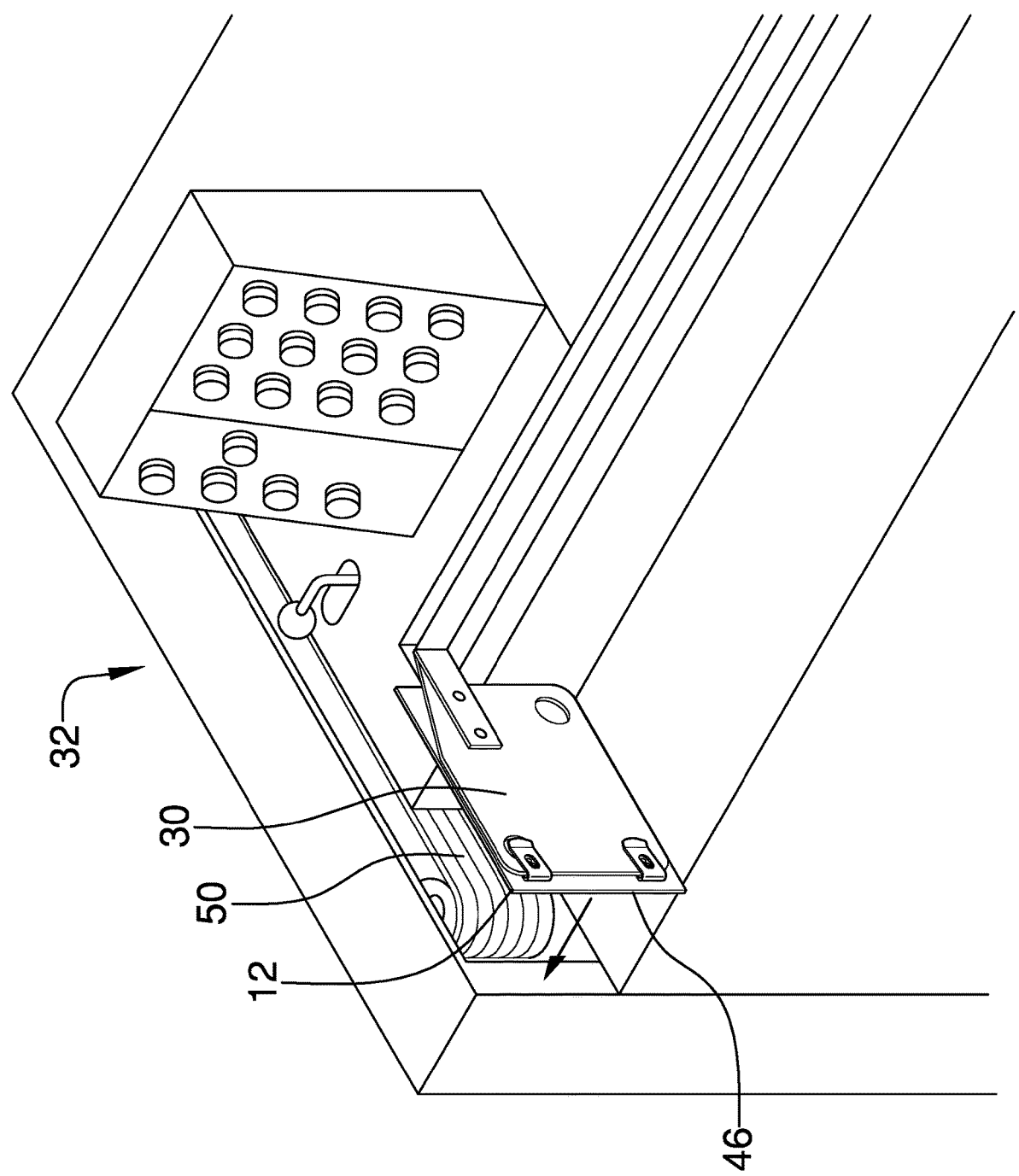
FIG. 7 is a perspective in-use view of an embodiment of the disclosure showing a paddle being positioned against a conveyor belt of a mail sorting machine.

With reference now to the drawings, and in particular to FIGS. 1 through 7 thereof, a new sanding device embodying the principles and concepts of an embodiment of the disclosure and generally designated by the reference numeral 10 will be described.

As best illustrated in FIGS. 1 through 7, the conveyor belt sanding assembly 10 generally comprises a panel 12 which is comprised of a rigid material. The panel 12 has a first surface 14, a second surface 16 and a perimeter edge 18 extending between the first surface 14 and the second surface 16, and the perimeter edge 18 has a top side 20, a bottom side 22, a first lateral side 24 and a second lateral side 26. Additionally, the panel 12 is elongated betweens the first lateral side 24 and the second lateral side 26. A pair of clips 28 is each coupled to the panel 12 and each of the clips 28 releasably engages a paddle 30 of a mail sorting machine 32 thereby mounting the panel 12 to the paddle 30. The mail sorting machine 32 may comprise a mail sorting machine that is employed by the United States Postal Service for sorting mail.

Each of the clips 28 has a first portion 34, a second portion 36 and a curve 38 positioned between the first portion 34 and the second portion 36 such that the first portion 34 is oriented to be coextensive with the first portion 34. The first portion 34 has a distal end 40 with respect to the curve 38 and the second portion 36 has a distal end 42 with respect to the curve 38. The second portion 36 of each of the clips 28 has a bend 44 that is spaced from the distal end 42 of the second portion 36 such that the distal end 42 of the second portion 36 is directed away from the distal end 40 of the first portion 34. In this way the clips 28 are facilitated to insertably receive an edge 46 of the paddle 30 having the second surface 16 of the panel 12 lying against a forward face 48 of the paddle 30. Thus, the first surface 14 of the panel 12 is directed toward a conveyor belt 50 of the mail sorting machine 32.

The first portion 34 of each of the clips 28 lies against the second surface 16 of the panel 12. Additionally, each of the clips 28 is positioned adjacent to the first lateral side 24 of the perimeter edge 18 of the panel 12 having the distal end 42 of the second portion 36 and the distal end 40 of the first portion 34 each being directed toward the second lateral side 26 of the perimeter edge 18. Each of the clips 28 is positioned adjacent to a respective one of the top side 20 and the bottom side 22 of the perimeter edge 18. The second portion 36 of each of the clips 28 has an aperture 52 extending through the second portion 36 thereby facilitating access to a fastener 54 which extends through the first portion 34 and engages the panel 12 for attaching the clips 28 to the panel 12. Furthermore, the aperture 52 is centrally positioned between the curve 38 and the bend 44.

A sheet of sand paper 56 is bonded to the panel 12 and the sheet of sand paper 56 is positioned on an opposing surface of the panel 12 with respect to the clips 28. In this way the sheet of sand paper 56 is directed toward the conveyor belt 50 of the mail sorting machine 32. The sand paper 56 abrades the conveyor belt 50 when the paddle 30 is moved against the conveyor belt 50. Thus, the sand paper 56 enhances the capacity of the conveyor belt 50 to frictionally engage mail that is being sorted by the mail sorting machine 32.

The sheet of sand paper 56 has a front surface 58 and a back surface 60, and the back surface 60 is bonded to the first surface 14 of the panel 12. Thus, the front surface 58 of the sand paper 56 engages the conveyor belt 50 when the paddle 30 is moved against the conveyor belt 50. The front surface 58 of the sand paper 56 is comprised of an abrasive material for abrading the conveyor belt 50. The panel 12 has a height that is at least equivalent to a width of the conveyor belt 50 thereby facilitating the sand paper 56 to abrade the full width of the conveyor belt 50. The sheet of sand paper 56 extends between the top side 20 and the bottom side 22 of the perimeter edge 18 of the panel 12. Furthermore, the sheet of sand paper 56 is positioned closer to the second lateral side 26 of the perimeter edge 18 of the panel 12 than the first lateral side 24 of the perimeter edge 18.

In use, the panel 12 is positioned on the paddle 30 such that each of the clips 28 engages an edge of the paddle 30 having the second surface 16 of the panel 12 lying against the forward surface of the paddle 30. In this way the sandpaper 56 abrades the conveyor belt 50 when the paddle 30 is moved against the conveyor belt 50. Thus, the sand paper 56 abrades the conveyor belt 50 for roughing the conveyor belt 50. In this way the conveyor belt 50 can more effectively frictionally engage mail that is being sorted by the mail sorting machine 32. Moreover, the conveyor belt 50 can be safely sanded without requiring an individual to manually sand the conveyor belt 50.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A conveyor belt sanding assembly for roughing a conveyor belt of a mail sorting machine thereby enhancing efficiency of the mail sorting machine, said assembly comprising:
  a panel being comprised of a rigid material;
  a pair of clips, each of said clips being coupled to said panel, each of said clips releasably engaging a paddle of a mail sorting machine thereby mounting said panel to the paddle; and
  a sheet of sand paper being bonded to said panel, said sheet of sand paper being positioned on an opposing surface of said panel with respect to said clips such that said sheet of sand paper faces toward the conveyor belt of the mail sorting machine, said sand paper abrading the conveyor belt when the paddle is moved against the conveyor belt wherein said sand paper is configured to enhance the capacity of the conveyor belt to frictionally engage mail that is being sorted by the mail sorting machine.

2. The assembly according to claim 1, wherein said panel has a first surface, a second surface and a perimeter edge extending between said first surface and said second surface, said perimeter edge having a top side, a bottom side, a first lateral side and a second lateral side, said panel being elongated between said first lateral side and said second lateral side.

3. The assembly according to claim 1, wherein:
  each of said clips has a first portion, a second portion and a curve positioned between said first portion and said second portion such that said first portion is oriented to be coextensive with said first portion, said first portion having a distal end with respect to said curve, said second portion having a distal end with respect to said curve; and
  said second portion of each of said clips having a bend being spaced from said distal end of said second portion such that said distal end of said second portion is directed away from said distal end of said first portion such that said clips are facilitated to insertably receive an edge of the paddle having said second surface of said panel lying against a forward face of the paddle such that said first surface of said panel is directed toward a conveyor belt of the mail sorting machine.

4. The assembly according to claim 3, wherein:

said panel has a first surface, a second surface and a perimeter edge extending between said first surface and said second surface, said perimeter edge having a top side, a bottom side, a first lateral side and a second lateral side; and said first portion of each of said clips lies against said second surface of said panel, each of said clips being positioned adjacent to said first lateral side of said perimeter edge of said panel having said distal end of said second portion and said distal end of said primary portion each being directed toward said second lateral side of said perimeter edge, each of said clips being positioned adjacent to a respective one of said top side and said bottom side of said perimeter edge.

5. The assembly according to claim 4, wherein said second portion of each of said clips has an aperture extending through said second portion thereby facilitating access to a fastener which extends through said first portion and engages said panel for attaching said clips to said panel, said aperture being centrally positioned between said curve and said bend.

6. The assembly according to claim 4, wherein said sheet of sand paper has a front surface and a back surface, said back surface being bonded to said first surface of said panel such that said front surface of said sand paper engages the conveyor belt when the paddle is moved against the conveyor belt, said front surface of said sand paper being comprised of an abrasive material for abrading the conveyor belt.

7. The assembly according to claim 1, wherein said panel has a height being at least equivalent to a height of the conveyor belt thereby facilitating said sand paper to abrade the height of the conveyor belt.

8. The assembly according to claim 4, wherein said sheet of sand paper extends between said top side and said bottom side of said perimeter edge of said panel, said sheet of sand paper being positioned closer to said second lateral side of said perimeter edge of said panel than said first lateral side of said perimeter edge.

9. A conveyor belt sanding assembly for roughing a conveyor belt of a mail sorting machine thereby enhancing efficiency of the mail sorting machine, said assembly comprising:

a panel being comprised of a rigid material, said panel having a first surface, a second surface and a perimeter edge extending between said first surface and said second surface, said perimeter edge having a top side, a bottom side, a first lateral side and a second lateral side, said panel being elongated betweens said first lateral side and said second lateral side;

a pair of clips, each of said clips being coupled to said panel, each of said clips releasably engaging a paddle of a mail sorting machine thereby mounting said panel to the paddle, each of said clips having a first portion, a second portion and a curve positioned between said first portion and said second portion such that said first portion is oriented to be coextensive with said first portion, said first portion having a distal end with respect to said curve, said second portion having a distal end with respect to said curve, said second portion of each of said clips having a bend being spaced from said distal end of said second portion such that said distal end of said second portion is directed away from said distal end of said first portion such that said clips are facilitated to insertably receive an edge of the paddle having said second surface of said panel lying against a forward face of the paddle such that said first surface of said panel is directed toward a conveyor belt of the mail sorting machine, said first portion of each of said clips lying against said second surface of said panel, each of said clips being positioned adjacent to said first lateral side of said perimeter edge of said panel having said distal end of said second portion and said distal end of said primary portion each being directed toward said second lateral side of said perimeter edge, each of said clips being positioned adjacent to a respective one of said top side and said bottom side of said perimeter edge, said second portion of each of said clips having an aperture extending through said second portion thereby facilitating access to a fastener which extends through said first portion and engages said panel for attaching said clips to said panel, said aperture being centrally positioned between said curve and said bend; and a sheet of sand paper being bonded to said panel, said sheet of sand paper being positioned on an opposing surface of said panel with respect to said clips such that said sheet of sand paper faces toward the conveyor belt of the mail sorting machine, said sand paper abrading the conveyor belt when the paddle is moved against the conveyor belt wherein said sand paper is configured to enhance the capacity of the conveyor belt to frictionally engage mail that is being sorted by the mail sorting machine, said sheet of sand paper having a front surface and a back surface, said back surface being bonded to said first surface of said panel such that said front surface of said sand paper engages the conveyor belt when the paddle is moved against the conveyor belt, said front surface of said sand paper being comprised of an abrasive material for abrading the conveyor belt, said panel having a height being at least equivalent to a height of the conveyor belt thereby facilitating said sand paper to abrade the height of the conveyor belt, said sheet of sand paper extending between said top side and said bottom side of said perimeter edge of said panel, said sheet of sand paper being positioned closer to said second lateral side of said perimeter edge of said panel than said first lateral side of said perimeter edge.

10. A conveyor belt sanding system for roughing a conveyor belt of a mail sorting machine thereby enhancing efficiency of the mail sorting machine, said system comprising:

a mail sorting machine including a paddle and a conveyor belt, said paddle having a front surface;

a panel being comprised of a rigid material, said panel having a first surface, a second surface and a perimeter edge extending between said first surface and said second surface, said perimeter edge having a top side, a bottom side, a first lateral side and a second lateral side, said panel being elongated betweens said first lateral side and said second lateral side;

a pair of clips, each of said clips being coupled to said panel, each of said clips releasably engaging said paddle of said mail sorting machine thereby mounting said panel to said paddle, each of said clips having a first portion, a second portion and a curve positioned between said first portion and said second portion such that said first portion is oriented to be coextensive with said first portion, said first portion having a distal end with respect to said curve, said second portion having a distal end with respect to said curve, said second portion of each of said clips having a bend being spaced from said distal end of said second portion such that said distal end of said second portion is directed away from said distal end of said first portion such that said clips are facilitated to insertably receive an edge of said paddle having said second surface of said panel lying against a forward face of said paddle such that said first surface of said panel is directed toward said conveyor belt of said mail sorting machine, said first portion of each of said clips lying against said second surface of said panel, each of said clips being positioned adjacent to said first lateral side of said perimeter edge of said panel having said distal end of said second portion and said distal end of said primary portion each being directed toward said second lateral side of said perimeter edge, each of said clips being positioned adjacent to a respective one of said top side and said bottom side of said perimeter edge, said second portion of each of said clips having an aperture extending through said second portion thereby facilitating access to a fastener which extends through said first portion and engages said panel for attaching said clips to said panel, said aperture being centrally positioned between said curve and said bend; and a sheet of sand paper being bonded to said panel, said sheet of sand paper being positioned on an opposing surface of said panel with respect to said clips such that said sheet of sand paper faces toward said conveyor belt of said mail sorting machine, said sand paper abrading said conveyor belt when said paddle is moved against said conveyor belt wherein said sand paper is configured to enhance said conveyor belt to frictionally engage mail that is being sorted by said mail sorting machine, said sheet of sand paper having a front surface and a back surface, said back surface being bonded to said first surface of said panel such that said front surface of said sand paper engages said conveyor belt when said paddle is moved against said conveyor belt, said front surface of said sand paper being comprised of an abrasive material for abrading said conveyor belt, said panel having a height being at least equivalent to a height of said conveyor belt thereby facilitating said sand paper to abrade the height of said conveyor belt, said sheet of sand paper extending between said top side and said bottom side of said perimeter edge of said panel, said sheet of sand paper being positioned closer to said second lateral side of said perimeter edge of said panel than said first lateral side of said perimeter edge.

\* \* \* \* \*